Patented Jan. 14, 1947

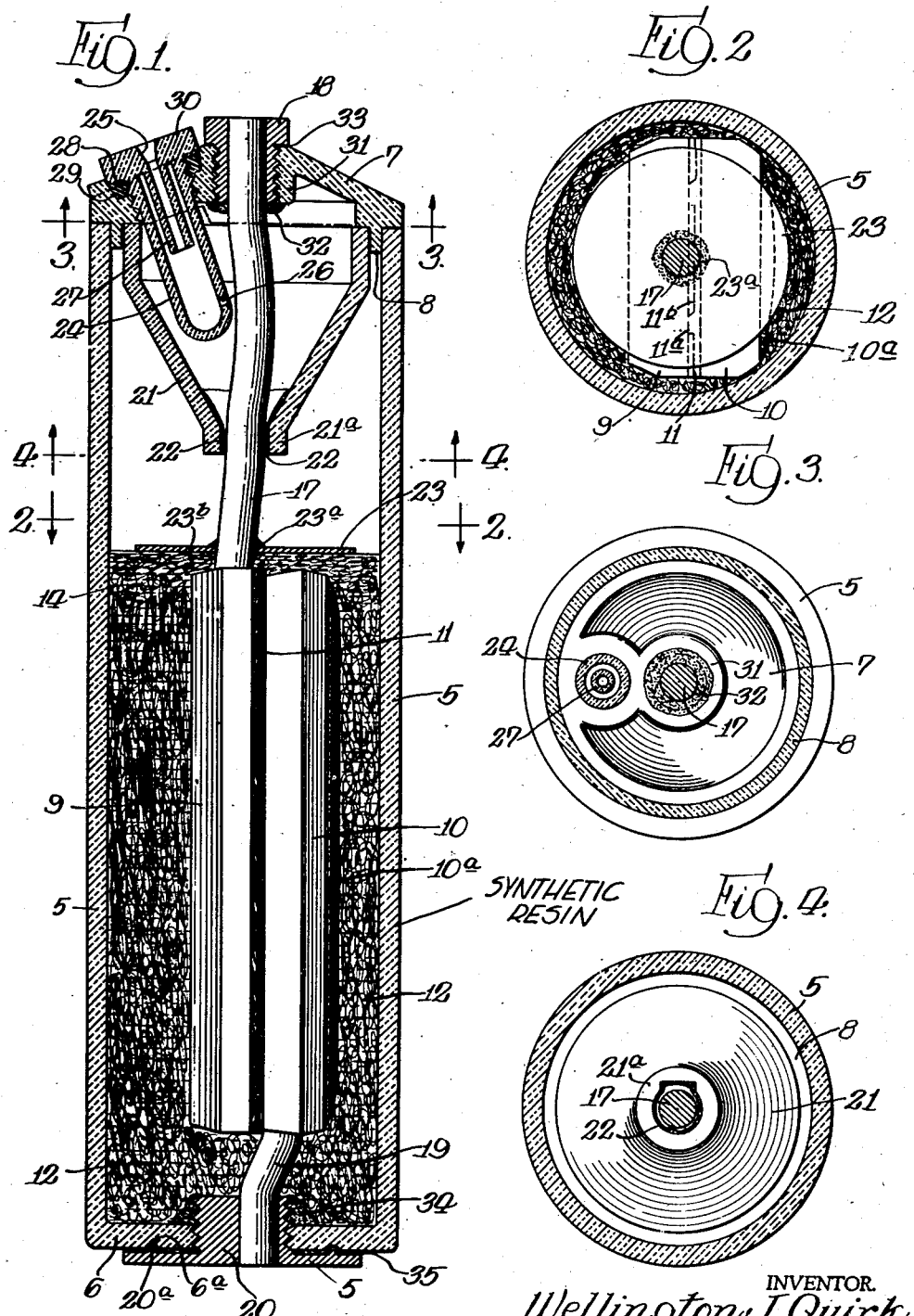

2,414,210

UNITED STATES PATENT OFFICE 2,414,210

BATTERY

Wellington J. Quirk, Deerfield, Ill., assignor to Quirk Battery Company, Highland Park, Ill., a corporation of Illinois Application June 24, 1940, Serial No. 342,033

10 Claims. (Cl. 136—6)

The invention relates generally to a battery, and more particularly to a storage or wet cell battery. This application is a continuation in part of my application Serial No. 209,903, filed May 25, 1938.

One object of the invention is to provide a storage battery of new and improved construction, rendering the same leak-proof in all positions thereof, in order that the battery shall be adaptable for many uses for which storage or wet cell batteries have heretofore been unsuitable.

Another object is to provide a storage battery having venting means of new and improved construction and in a unique location, permitting ready and constant venting of the battery while preventing leakage of the electrolyte through the venting means.

A particular object of the invention is to provide a wet cell battery in which splashing of the electrolyte within the battery, due to movement or change of position of the battery, and the possibility of leakage, are reduced to a minimum by the provision of means in the nature of an absorbent packing adjacent the plates, which prevents splashing while permitting free circulation of the electrolyte and free access thereof to the plates.

A further object is the perfection of a small storage battery which corresponds in size and shape to the dry cell of a flashlight, and which has terminals at its ends to permit substitution of such storage battery for a dry cell in a flashlight.

It is also an object of the invention to provide a storage battery constructed in a manner which renders it simple and convenient to assemble the parts and to secure them in permanently assembled relation.

Yet another object is the perfection of a small, compact storage battery, having a casing generally cylindrical in shape, with a closure member for one end provided with a metallic terminal with a lead connected thereto and supporting one of the plates, and with vent means and a shield structure all assembled on said closure, together with a closure for the other end of the cylinder embodying a centrally disposed metallic terminal with a lead connecting with and supporting the other plate within the casing.

Other objects and advantages will become apparent from the following detailed description taken in connection with the accompanying drawing in which:

Fig. 1 is a diametrical sectional view of a battery embodying the features of the invention.

Fig. 2 is a transverse sectional view taken substantially as indicated at the line 2—2 on Fig. 1.

Fig. 3 is a transverse sectional view taken as indicated at the line 3—3 on Fig. 1.

Fig. 4 is a transverse sectional view taken as indicated at line 4—4 on Fig. 1.

The drawing illustrates a battery adapted for use in portable flashlights and like devices, but it will be understood that the features of the invention are applicable to batteries of various sizes and proportions. While the invention is susceptible of various modifications and alternative constructions, the single embodiment shown in the drawings and described hereinafter is by way of preferred illustration only, and it is not intended that the invention be limited thereto or thereby, but it is intended to cover all modifications and alternative constructions falling within the spirit and scope of the invention as defined by the appended claims.

As shown in the drawing, the particular embodiment of the invention disclosed herein includes a generally cylindrical casing comprising a tubular body 5 having a preferably integral bottom wall 6 and a separate cap or cover portion 7. These parts may be composed of any suitable material impervious to acid, such as rubber, or some of the synthetic plastic materials such as the transparent composition known as "Lucite" (methyl methacrylate). The use of the latter composition has the advantage that the quantity of electrolyte in the battery may readily be observed. It is not so important that the cap 7 be of transparent material, but it is convenient to make it of the same material as the tubular part 5, so that the tubular body and the cover can be readily cemented together. The cap 7 is provided with a depending skirt portion 8 which fits snugly within the cylindrical body 5 when the parts are assembled. As shown in the drawing, the tubular casing stands upright, and for many purposes it may be so mounted in its position of use; but it is a feature of this invention that the battery is so constructed that it may be employed as a substitute for a dry cell subject to movement and change of position, and, accordingly, the battery illustrated is of the proportions commonly employed in a flashlight of average size, and replaces two dry cells.

Disposed within the cylindrical body 5 of the casing and spaced at some distance from the cap 7 are a pair of plates or electrodes 9 and 10. These plates may be formed as hollow grids, in a well understood manner, and each packed with a quantity of active material in paste form as indicated by the bulge of the active material at 10ᵃ on the positive plate 10. A flat separator 11 of wood or other suitable porous material is disposed between the plates 9 and 10 and extends for a substantial distance below their lower ends to prevent the possibility of a short circuit between them. As shown, the separator is formed with longitudinally extending ribs 11ᵃ on the face which is disposed against the negative plate 9, thus providing clearance grooves 11ᵇ for the escape of gas which forms on this plate.

Preferably, the plates and the separator 11 are spaced a short distance from the lower end of the casing, and this space, as well as the space around the plates and within the tubular wall 5, is filled with absorbent means 12 in the nature of a loose and porous packing of acid-resisting material, for which purpose glass wool has been found to be very suitable. The plates 9 and 10 are bathed in the usual manner by suitable electrolyte 14 with which the packing material 12 is substantially saturated, but which does not normally extend above the level of the packing in the casing 5. The intercommunicating interstices of the packing material afford ample opportunity for circulation of the electrolyte, while the substantially capillary proportions of these spaces operate to prevent the liquid from flowing toward the open spaces in the casing when the battery is temporarily tipped on its side, or inverted.

It will be apparent from the foregoing description that, with the plates constructed in the manner described, and with the spaces adjacent the plates substantially filled with absorbent packing material, the amount of electrolyte required to maintain the plates submerged is reduced to a minimum. Thus there is practically no free electrolyte in the casing, and no splashing of the electrolyte, with resultant possibility of leakage; and when the battery is placed on its side, or inverted, an ample quantity of electrolyte will be maintained by the packing in contact with both plates. At the same time, it is found by experience that the glass wool prevents oxides from settling to the bottom and building an undesirable deposit of sediment. The presence of the glass wool also operates to retard the bubbling of the electrolyte during the charging of the battery; and the bubbles which form are held captive, to a large extent, in the glass wool until, on combining, they finally escape or break.

In order further to adapt the battery for use in place of the dry cell, and, more particularly, as a flashlight battery, the plates 9 and 10 are connected to terminals located axially of the battery casing and at its opposite ends, respectively. As shown in the drawing, the plate 9 is connected by a lead 17 to a metallic terminal 18, which may be molded in the cap 7 in fluid-tight relation, or tightly screw-threaded therein, as shown. The plate 10 is connected by a lead 19 to a metallic terminal 20 at the opposite end of the battery, also in a fluid-tight relationship, which, as shown, is secured partly by threaded engagement. Both leads 17 and 19 have a fluid-tight fit in their respective terminals 18 and 20, and also have a good electrical contact therewith obtained in a conventional manner, as by soldering or welding. The terminals 18 and 20 are both located substantially in co-axial relation in the casing, the terminal 20 having a large flat head portion which covers almost the entire lower end 6 of the casing in simulation of the construction of dry cells used for flashlights.

In order that the interior of the battery may be vented to permit the escape of gas formed as a result of the chemical action, special venting means is provided which is of such construction, and so positioned, as to insure that there will be no leakage of the electrolyte by way of the vent openings, regardless of the position which the battery may assume, and regardless of bodily movements which may be imparted thereto. This venting means includes a funnel-like shield 21 which is shown connected in fluid-tight relation to the skirt 8 of the cap 7. This shield depends from the skirt 8 and becomes progressively smaller in diameter, terminating in an annular collar 21a through which the lead 17 extends. The collar 21 may be made as a loose fit around the lead 17, with sufficient clearance at 22 to serve as a vent passage leading from the space which contains the plates and the electrolyte and in which space the gas is originally formed. Thus, if any liquid should find its way into the shield 21, it will readily flow back through the vent 22 when the battery is placed in upright position. The length of the shield 21, that is, the distance from the skirt 8 to the lower edge of the collar 21ᵃ, is such that the vent at 22 will be above the level of the electrolyte when the battery stands in upright position; and while the presence of the glass wool packing material 12 will prevent any substantial quantity of the electrolyte from flowing toward the upper end of the casing if the latter is inverted or placed on its side, such liquid as may free itself from the absorbent packing 12 will be easily accommodated in the space between the cylindrical wall 5 of the casing and the exterior of the conical or funnel-like shield 21. Either with the casing lying on its side, or fully inverted, the level of the liquid thus accumulating in the cavity adjacent the shield 21 will always be below the position of the vent 22 which is located closely adjacent the axis of the tubular body 5.

To define the upper limit to which the packing material 12 extends in the casing, and to hold this packing in position, there is secured to the lead 17, just above the plates 9 and 10, a disk 23 of Celluloid, rubber or other acid-resisting material. Such securement may be effected by means of a quantity of paraffin applied in the form of a fillet 23ᵃ on the upper face of the disk adjacent the lead, and as a second fillet 23ᵇ just below the disk; incidentally, this forms a leak-proof joint which tends to prevent the liquid electrolyte from trickling along the lead and into the shield 21 when the battery is inverted.

The interior of the shield 21 is vented to atmosphere through means which further guards against the leakage of electrolyte. This means takes the form of a tube 24 which is screwed into the cap 7 and extends obliquely into the shield 21 to a point spaced from all sides of the shield and spaced from the cap 7. The tube 24 is closed at both ends save for a minute vent 25 in its outer end and a minute aperture 26 at its inner end opening through the side wall of the tube and preferably on the upper side thereof at a point lying closely adjacent the axis of the battery, so that, regardless of the position of the battery, the aperture 26 will always be spaced at a maximum distance from the side walls of the battery. Arranged concentrically within the tube 24 and spaced therefrom is a second tube 27 opening at its inner end to the space within the tube 24, and having the passage therein registering with the vent 25 of tube 24, and thus opening to atmosphere to complete the venting passage to the interior of the battery.

The tube 24 being screwed into a threaded aperture in the cap 7, is removable for initially filling the battery with its proper charge of acid electrolyte and for adding water at intervals, when necessary. To render the structure leak-proof, I include a rubber gasket 28 which may be seated in a recess 29 formed in the cap at the upper end of the threaded opening which receives the tube 24; and the upper end of the tube is provided with a head 30 of any suitable non-circular conformation such that it may be grasped for unscrewing the tube and replacing it.

As seen in Fig. 1, the terminal 18 for the lead 17 is screwed into a threaded boss 31 which extends inwardly from the under side of the cover 7. When the part 18 is to be set in place its threads are brushed with hot pitch, and the part 18 is heated so that the pitch adheres to said part while it is screwed into position in the cap 7. A small quantity of pitch is applied to the under side of the boss 31 and 32, as well as between the head of the part 18 and the outer surface of the cap, as indicated at 33, to further seal the terminal in the cap. Similarly, the terminal 20 for the lead 19 is brushed with pitch and heated, then screwed into a threaded opening in the bottom wall 6; and inside the tubular casing a small quantity of pitch is applied around the threaded inner end of the terminal 20 at 34. An additional quantity of pitch is inserted between the flat head of the terminal 20 and the outer face of the bottom wall 6 at 35, and, preferably, said outer face is formed with an annular groove 6ᵃ which interengages an annular rib 20ᵃ on the terminal 20, so that the rib presses the pitch into the groove 6ᵃ as the terminal is screwed into final position. When the leads 17 and 19 are inserted respectively in the terminals 18 and 20, sufficient heat is applied (with the addition of flux and solder, if desired) to form a metallic seal between each lead and its terminal, and the application of heat for this purpose softens and thins the pitch on the threads of the terminals 18 and 20, and adjacent thereto, causing it to be drawn into the threads for completing the seal between the terminals and the end walls of the casing. Even after cooling, the pitch remains in a sufficiently yieldable state to take up expansion and contraction between the metal of which the terminals 18 and 20 are composed, and the "Lucite" or other plastic material from which the casing and its cap 7 are constructed.

When the shield 21 is fitted into the skirt 8 of the cap 7 for assembly therewith, the upper edge of the shield and the inner surface of the skirt are coated with a cement or solvent suited to the particular material of which these parts are made, and serving to form a bond which renders the shield 21 substantially integral with the cap 7. When the cap 7 is finally fitted over the end of the tubular casing 5 the outer surface of its skirt 8 and adjacent portions of the cap may be similarly cemented to the tube 5 in a permanent and substantially integral bond. Thus the cavity of the casing 5 is sealed against leakage of liquid at all the joints between the several parts of which the casing is composed, and the vents 22, 26 and 25 which are provided for the escape of gas formed by chemical action in the battery are so placed that, regardless of the position in which the battery is disposed, there is no chance for liquid to escape therefrom.

Preferably, the cap 7 is of outwardly convex form, being shown as substantially conical. This brings the head 30 of the tube 24 onto the sloping outer surface of the cap 7 so that it does not project above the outer end of the metallic terminal 18 and thus will not interfere with contacting engagement of the terminal with a cooperating contact in a flashlight or other structure in which the battery is used. Interiorly, the cap 7 is concave, forming a dome-shaped structure over the end of the tubular casing 5. The central boss 31, in which the terminal 18 is located, forms a protection for the terminal against contact with any small quantity of acid which may flow into the dome-shaped cavity of the cap 7 when the battery is inverted. Particularly during charging, the gas bubbles escaping from the plates may tend to accumulate on the under side of the cap 7 and may either break or condense, leaving a small deposit of liquid; but the outwardly sloping form of this inner surface of the cap or dome 7 tends to lead such liquid outwardly and thence downwardly into the funnel-shaped shield 21 for return to the porous material at 12 instead of permitting it to accumulate on the lead 17 or its attached terminal 18.

Thus, while the quantity of absorbent material, such as glass wool, at 12, is normally sufficient to hold all the liquid electrolyte in the battery when it is placed in its normal upright position, the structure herein shown and described provides ample accommodation for any liquid which escapes from the porous packing 12 when the cell is inverted or lies on its side, and such accommodation is so arranged that the free liquid shall at no time reach a level at which it could escape by way of the vents which are provided for releasing gas formed by chemical action in the battery.

I claim as my invention:

1. In a storage battery having a casing composed of an open-ended main portion and a cover portion having an annular depending skirt at its periphery sealed in the open end of said main portion to provide a fluid-tight joint, means for venting the interior of the casing to atmosphere while preventing the escape of the liquid within the casing comprising a shield extending from the skirt in fluid-tight relation thereto, said shield having a progressively decreasing diameter and terminating in a tip centrally disposed in the casing with a vent aperture in said tip portion positioned above the normal level of liquid in the casing, said shield being otherwise imperforate, a first tube projecting through the cover portion and into the space confined by the shield, said tube having a threaded engagement with the cover portion and having an opening at its outer end and an aperture substantially at its inner end located closely adjacent the axis of the casing and spaced from the cover portion and said shield, and a smaller tube opening at one end to the space within said first tube and at the other end registering with the opening in the outer end of said first tube to complete the venting passage for the interior of the casing.

2. A storage battery comprising, in combination, a cylindrical casing including a cover therefor, a plurality of plates positioned upright in the lower portion of said casing, a liquid electrolyte in said casing normally covering said plates when said casing is in an upright position, a porous packing material filling the space occupied by said electrolyte between the casing and the plates to a point a short distance above the top of said plates, means for venting the upper portion of said casing comprising a first tubular member substantially integral with said cover and extending downwardly to a position above the normal level of the electrolyte, said member being imperforate save for a venting aperture adjacent its lower end, a second tubular member projecting through the cover to a point within the first tubular member and having a venting aperture adjacent its lower end and a third tubular member positioned within the second tubular member and having a venting aperture adjacent its inner end and its outer end opening to atmosphere, and a lead extending from one of the plates through the lower end of the first tubular member adjacent its venting aperture and through said member to a terminal fixed in the cover, together with a disk of acid-resisting material sealed on said lead, constituting a flange extending transversely from all sides of the lead above said porous packing and below the venting aperture of said first tubular member, said disk being dimensioned to extend adjacent the wall of the casing but not into contact therewith, said disk being secured to the lead in liquid-tight engagement therewith.

3. A storage battery comprising, in combination, an elongated tubular casing having a main portion and a cover portion joined to said casing in fluid-tight relation, plates in the main portion with a quantity of electrolyte in which the plates are bathed, and a lead extending from one of said plates through the cover in sealed relation thereto, said cover being of dome-shaped formation and the lead extending substantially through the center thereof with the under surface of the cover sloping outwardly from the vicinity of the lead, and a downwardly extending shield joined to the marginal portion of the cover to constitute a continuation of its outwardly sloping inner surface, said shield converging downwardly toward the lead and enclosing the portion of the same adjacent the cover, said shield having a vent in its lower portion and the cover having a vent leading from within the shield.

4. A storage battery comprising, in combination, an elongated tubular casing having a main portion and a cover portion, a fluid-tight joint between said portions, a plurality of plates in said main portion, a lead extending from one of said plates through the cover in liquid-tight relation thereto, a liquid electrolyte in the casing normally covering the plates, a porous packing surrounding the plates and filling the space between them and the side walls of the casing, a hollow shield depending from the cover portion and enclosing a space within the casing adjacent the cover and around said lead, said space having a vent for gas leading out through the cover and a vent leading in adjacent said lead, and a disk on the lead in liquid-tight relation thereto positioned between the ends of the plates and said shield preventing the electrolyte from running along the lead directly from the plates and into the hollow shield when the battery is inverted.

5. A storage battery comprising, in combination, an elongated tubular casing having a main portion and a cover portion completing said casing with a fluid-tight joint between said portions of the casing, a plurality of plates in the main portion, a lead from one of said plates extending centrally through the cover and having a terminal sealed therein, means for venting the interior of said casing to atmosphere comprising a funnel-like shield extending inwardly from the cover in fluid-tight relation thereto, said shield having a progressively decreasing diameter and terminating in a tip centrally disposed in the casing, the said lead extending through said tip and the tip portion having a vent aperture, said shield being otherwise imperforate, a tube projecting obliquely through the cover portion into the space confined by the shield, said tube having a threaded engagement with the cover portion and having an aperture adjacent its lower end disposed substantially at the axis of the casing, and a second tube positioned axially within the first tube in spaced relation to the side walls thereof and terminating short of the inner end of the first tube, said second tube having a passage communicating with atmosphere.

6. A storage battery comprising, in combination, an elongated tubular casing having a main portion and a cover portion, each of synthetic plastic material, an interflowed substantially integral bond providing a sealed completely fluid-tight joint between said portions, a plurality of plates in said main portion, a liquid electrolyte in the casing normally covering the plates, a packing of glass wool surrounding the plates and filling the space between them and the side walls of the casing to reduce to a minimum the amount of free electrolyte and to retain electrolyte about the plates by capillary attraction when the battery is inverted, means for venting the interior of said casing to atmosphere while preventing escape of electrolyte in any position of the battery comprising a funnel-like shield extending inwardly from the cover portion in fluid-tight relation thereto to provide between it and the side walls of the casing a space for holding free electrolyte when the battery is inverted, and a pair of tubes one within the other projecting through the cover portion into the space confined by the shield and providing a liquid trapping path for the escape of air, a pair of leads one extending upwardly from one of the plates through the tip of said funnel-like shield and the other extending downwardly from the other of said plates, an annular disk surroundingly sealed onto said upwardly extending lead intermediate the plate and said shield to prevent flow of electrolyte along the lead into said shield, a threaded metallic terminal on each lead having a liquid-tight connection therewith, the cover portion and the closed end of the main portion of said casing each having a threaded opening in which a threaded terminal is fitted, and a quantity of plastic yieldable sealing material adhesively engaging the adjoining surfaces of the casing and each terminal inside of the casing and overlapping any space between the threads of the casing and the threads of the terminal to seal the casing at those points.

7. A storage battery comprising, in combination, an elongated tubular casing having a main portion and a cover portion, each of synthetic plastic material, a substantially integral bond providing a sealed completely fluid-tight joint between said portions, a plurality of plates in said main portion, a liquid electrolyte in the casing normally covering the plates, a packing of porous material surrounding the plates and filling the space between them and the side walls of the casing to reduce to a minimum the amount of free electrolyte and to retain electrolyte about the plates by capillary attraction when the battery is inverted, means for venting the interior of said casing to atmosphere while preventing escape of electrolyte in any position of the battery comprising a funnel-like shield extending inwardly from the cover portion in fluid-tight relation thereto to provide between it and the side walls of the casing a space for holding free electrolyte when the battery is inverted, and a pair of tubes one within the other projecting through the cover portion into the space confined by the shield and providing a liquid trapping path for the escape of air, a lead extending from each of the plates, one of the leads extending through the tip of said funnel-like shield and outwardly through said cover portion, an annular disk surroundingly sealed onto said last mentioned lead intermediate the plate and said shield to prevent flow of electrolyte along the lead into said shield, a threaded metallic terminal on each lead having a liquid-tight connection therewith, a pair of threaded openings in the casing in which the threaded terminals are fitted, and a quantity of plastic yieldable sealing material adhesively engaging the adjoining surfaces of the casing and each terminal inside of the casing and overlapping any space between the threads of the casing and the threads of the terminal to seal the casing at those points.

8. A storage battery comprising, in combination, an elongated tubular casing having a main portion and a cover portion each of nonmetallic material, a sealed completely fluid-tight joint between said portions, a plurality of plates in said main portion, a liquid electrolyte in the casing normally covering the plates, a packing of porous material surrounding the plates and filling the space between them and the side walls of the casing to reduce to a minimum the amount of free electrolyte and to retain electrolyte about the plates by capillary attraction when the battery is inverted, means for venting the interior of said casing to atmosphere while preventing escape of electrolyte in any position of the battery, a pair of leads one extending upwardly from one of the plates and the other extending downwardly from the other of said plates, a threaded metallic terminal on each lead having a liquid-tight connection therewith, the cover portion and the closed end of the main portion of said casing each having a threaded opening in which a threaded terminal is fitted, and a quantity of plastic yieldable sealing material adhesively engaging the adjoining surfaces of the casing and each terminal inside of the casing and overlapping any space between the threads of the casing and the threads of the terminal to complete the sealing of the casing against loss of electrolyte.

9. A storage battery comprising, in combination, an elongated tubular casing having a main portion and a cover portion, a sealed completely fluid-tight joint between said portions, a plurality of plates in said main portion, a liquid electrolyte in the casing normally covering the plates, a packing of glass wool surrounding the plates and filling the space between them and the side walls of the casing to reduce to a minimum the amount of free electrolyte and to retain electrolyte about the plates by capillary attraction when the battery is inverted, means for venting the interior of said casing to atmosphere while preventing escape of electrolyte in any position of the battery comprising a funnel-like shield extending inwardly from the cover portion in fluid-tight relation thereto to provide between it and the side walls of the casing a space for holding free electrolyte when the battery is inverted, and a pair of tubes one within the other projecting through the cover portion into the space confined by the shield and providing a liquid trapping path for the escape of air, a lead extending from each of the plates, one of the leads extending through the tip of said funnel-like shield and outwardly through said cover portion, an annular disk surroundingly sealed onto said last mentioned lead intermediate the plate and said shield to prevent flow of electrolyte along the lead into said shield, and a metallic terminal on each lead having a liquid-tight connection therewith and each terminal having a portion projecting through and sealed in the casing.

10. In the manufacture of a wet cell for a flashlight or the like having a non-metallic casing composed of a tubular, main portion open at one end and closed at the other and a cover portion, the closed end of the main portion and the cover portion each having a threaded aperture formed therein for the reception of a terminal, a pair of plates each having a lead extending therefrom, and a metallic terminal for each lead having a head, a threaded shank for threaded reception in the threaded openings in the casing, and an aperture for the reception of a lead; the steps of assembling the wet cell and of forming an electrolyte-tight seal between the casing and the terminals comprising coating the inner surface of the head and the threads of one of the terminals with hot pitch while the terminal is heated, threading the terminal with the pitch in a heated state into the threaded opening in the closed end of the main portion of the casing, forming a layer of pitch over the crevice between the terminal and the casing on the inside of the casing, coating the inner surface of the head and the threads of the other terminal with hot pitch while the terminal is heated, threading the terminal with the pitch in a heated state into the threaded opening in the cover portion, forming a layer of pitch over the crevice between the terminal and the cover portion on the inside of the cover portion, inserting the plates in the casing with the lead of one plate inserted into the terminal in the bottom wall of the main body portion, applying heat to the terminal to solder the lead to the terminal and simultaneously to soften the layer of pitch on the inside of the casing enabling further flow thereof into the crevice between the terminal and the casing, applying the cover portion to the main portion with the remaining lead received in the terminal in the cover portion, sealing the cover portion to the main portion and applying heat to the terminal to solder the lead to the terminal and simultaneously to soften the layer of pitch on the inside of the cover permitting the same to flow into any crevice between the cover and the terminal.

WELLINGTON J. QUIRK.